(12) United States Patent
Cini et al.

(10) Patent No.: US 6,259,584 B1
(45) Date of Patent: Jul. 10, 2001

(54) INTEGRATED DEVICE COMPRISING A SEMICONDUCTOR MATERIAL MICROACTUATOR, IN PARTICULAR FOR A HARD DISK READ/WRITE HEAD

(75) Inventors: Dario Cini, Cornaredo; Benedetto Vigna, Potenza, both of (IT)

(73) Assignee: STMicroelectronics S.r.l., Agrate Brianza (IT)

( * ) Notice: Subject to any disclaimer, the term of this patent is extended or adjusted under 35 U.S.C. 154(b) by 01 day.

(21) Appl. No.: 09/357,443

(22) Filed: Jul. 20, 1999

(30) Foreign Application Priority Data

Jul. 22, 1998 (EP) .................................................. 98830447

(51) Int. Cl.$^7$ .............................. G11B 21/02; G11B 5/53
(52) U.S. Cl. .......................................................... 360/294.6
(58) Field of Search ..................................... 360/290, 294, 360/294.1, 294.3, 294.5, 294.6; 310/309; 361/271

(56) References Cited

U.S. PATENT DOCUMENTS

| | | | |
|---|---|---|---|
| 4,943,750 | * | 7/1990 | Howe et al. ........................ 310/309 |
| 5,521,778 | * | 5/1996 | Boutaghou et al. ................. 360/106 |
| 5,959,808 | * | 9/1999 | Fan et al. ............................ 360/106 |

FOREIGN PATENT DOCUMENTS

840092 * 5/1998 (EP) .

* cited by examiner

*Primary Examiner*—David L. Ometz
*Assistant Examiner*—Angel Castro
(74) *Attorney, Agent, or Firm*—Theodore E. Galanthay; Robert Iannucci; Seed IP Law Group, PLLC

(57) ABSTRACT

A microactuator comprises an outer stator and an inner rotor electrostatically coupled to a stator. The rotor comprises a suspended mass with a substantially circular shape, and a plurality of mobile arms extending radially towards the exterior, starting from the suspended mass. The stator has a plurality of pairs of fixed arms extending radially to the suspended mass, a respective mobile arm being arranged between each pair of fixed arms. The fixed arms are divided into fixed drive arms connected to a drive stage for actuating the microactuator, and into fixed measure arms connected to a measure stage, and define a capacitive uncoupling structure.

17 Claims, 2 Drawing Sheets

INTEGRATED DEVICE COMPRISING A SEMICONDUCTOR MATERIAL MICROACTUATOR, IN PARTICULAR FOR A HARD DISK READ/WRITE HEAD

TECHNICAL FIELD

The present invention relates to an integrated device comprising a semiconductor material microactuator. In particular, the integrated device according to the present invention is used advantageously, but not exclusively, for actuation of hard disk read/write heads.

BACKGROUND OF THE INVENTION

As is known, for reading and writing a hard disk, use is generally made of a suspension that faces a surface of the hard disk when in an operative condition, so as to perform roll and pitch movements and to follow the surface of the hard disk.

It is also known to actuate a head by means of a double actuation stage, wherein a first actuation stage carries out a coarse movement of the head during tracking, and a second actuation stage performs finer adjustment of the head position. To implement the second actuation stage, it has been proposed to use an integrated microactuator of a rotary electrostatic type, interposed between the suspension and the head, to control the position of the head with micrometric accuracy.

An integrated microactuator 1 of an electrostatic type is shown schematically in FIG. 1. For a more detailed description of a structure of an integrated, rotary electrostatic microactuator, see for example U.S. Pat. No. 5,025,346. As shown in FIG. 1, the microactuator 1 comprises an outer stator 2, which is connected when in use to a suspension (not shown), and an inner rotor 4 electrostatically coupled to the stator 2 and supporting a read/write head (not shown).

The rotor 4 comprises a suspended mass 6 with a substantially circular shape, and a plurality of mobile arms 8 extending radially towards the exterior, starting from the suspended mass 6, and identical to one another and angularly equidistant from one another. Each mobile arm 8 supports a plurality of mobile electrodes 10 that extend in a substantially circumferential direction on both sides of the respective mobile arm 8.

The rotor 4 additionally comprises anchorages 14 and resilient suspension elements (shown as springs 12), resiliently connecting the suspended mass 6 to the anchorage regions 14, through which the rotor 4 and the mobile electrodes 10 are biased.

The stator 2 (only a part thereof is shown in full, owing to the symmetry of the structure) comprises a plurality of pairs of first and second fixed arms 20a, 20b arranged alternately to each other and extending radially towards the suspended mass 6, starting from fixed regions 22a, 22b disposed circumferentially around the rotor 4 and intercalated with the anchorage regions 14. The fixed regions 22a are connected to each other, as are the fixed regions 22b, as explained in detail hereinafter. These fixed regions 22a, 22b thus electrically define two nodes, which for simplicity are shown hereinafter as a first node 22a and a second node 22b.

The pairs of fixed arms 20a, 20b are associated with the mobile arms 8, such that a mobile arm 8 of the rotor 4 is arranged between two fixed arms 20a, 20b of each pair. Each fixed arm 20a, 20b also supports a plurality of fixed electrodes 24 extending in a substantially circumferential direction towards a corresponding mobile arm 8. The fixed electrodes 24 are interdigitated with the mobile electrodes 10 of the respective mobile arms 8. In the microactuator 1, the first fixed arms 20a, arranged on a same side of the respective mobile arms 8 (in the example illustrated in FIG. 1, the first fixed arms 20a are located to the right of the mobile arms 8), are all connected to the first node 22a, and are thus all biased to a same first potential. The second fixed arms 20b, arranged on the other side of the respective mobile arms 8 (in the example illustrated in FIG. 1, the second fixed arms 20b are located to the left of the mobile arms 8), are all connected to the second node 22b, and are thus all biased to a same second potential. A capacitive coupling is thereby provided between each fixed electrode 24 and the respective mobile electrode 10. The structure is electrically equivalent to a first plurality of capacitors connected in parallel between the first node 22a and the suspended mass 6, and to a second plurality of capacitors connected in parallel between the suspended mass 6 and the second node 22b.

The microactuator 1 is connected via the nodes 22a, 22b to a drive stage 30 (shown in FIG. 2), the purpose of which is to apply potential differences between the fixed arms 20a, 20b and the respective mobile arm 8, so as to rotate the rotor 4 with respect to the stator 2. In particular, due to capacitive coupling between each mobile arm 8 and the respective pair of fixed arms 20a, 20b, the suspended mass 6 is subjected to a transverse force that is proportional to the number of pairs of fixed arms 20a, 20b and mobile arms 24 associated with each other. This force tends to space the mobile arm 8 from a fixed arm 20a, 20b having a lower potential difference, and to draw the mobile arm 8 closer to a fixed arm 20b, 20a having a higher potential difference. Thus a rotation of the suspended mass 6 is caused to consequently actuate the read/write head.

In prototypes of microactuators proposed hitherto, the nodes 22a, 22b are also used to obtain data relating to the relative positions of the rotor 4 and the stator 2. The nodes 22a, 22b are thus simultaneously drive nodes and measure nodes. A position signal obtained thereby is then used in a feedback loop to carry out adjustment of the position of the read/write head. Therefore, it is possible to increase a mechanical band of a microactuator-head system and to read data recorded on increasingly narrow and dense tracks of the hard disk. This solution is described for example in an article entitled "Magnetic Recording Head Positioning at Very High Track Densities Using a Microactuator-Based Two-Stage Servo System" by Long-Sheng Fan, Hal H. Ottensen, Timothy C. Reiley and Roger W. Wood, IEEE Transaction on Industrial Electronics, vol. 42, no. 3, June 1995.

However, since voltages generated by the drive stage 30 have relatively high amplitudes of approximately 80 V, and on the other hand a stage downstream (shown as a measure stage 32 in FIG. 2) that processes the obtained position data operates with much lower voltages of approximately 5 V, it is often necessary to arrange an uncoupling structure 34 between the nodes 22a, 22b and the measure stage 32 to obtain required displacements of the rotor 4.

FIG. 2 shows an electrical equivalent of the microactuator 1, comprising two variable capacitors 40, 42 arranged in series and representing respective capacitive coupling between the electrodes 24, 10 of the first fixed arms 20a and the mobile arm 8, respectively, and between the electrodes 10, 24 of the mobile arm 8 and the second fixed arms 20b, respectively. In particular, in FIG. 2, an intermediate node 6 between the two variable capacitors 40, 42 represents the suspended mass 6 of the rotor 4.

The uncoupling structure 34 comprises two disconnection capacitors 44, 46. In particular, the disconnection capacitor 44 is arranged between the first node 22a and a first input of the measure stage 32 (represented as an operational amplifier), and the disconnection capacitor 46 is arranged between the second node 22a and a second input of the measure stage 32. In practice, the disconnection capacitors 44, 46 are arranged on a path of a signal containing data related to a position of the rotor 4 with respect to the stator 2. In these proposed microactuators, the uncoupling capacitors 44, 46 are formed through two metal layers at different levels, so as to both prevent distortion of the signal containing the data related the position of the rotor 4 and to withstand high ohmic drops present in the structure.

The microactuators proposed hitherto have many disadvantages. In particular, the uncoupling capacitors 44, 46 form, with the capacitors 40, 42, a capacitive divider that causes signal attenuation, thereby reducing resolution of measurements made by the measure stage 32. In addition, parasitic capacitances associated with metal layers that form the uncoupling capacitors 44, 46 further reduce the signal supplied to the measure stage 32.

Also, the microactuators proposed hitherto occupy a very large area, because of both the specific low capacitance of the metal layers and because of signal-processing circuits that have a lower background noise level than the amplitude of the data signals (of approximately 100 $\mu$V). The large area occupied consequently causes an increase in weight which the suspension supporting the read/write head must bear. This lowers a mechanical resonance frequency and gives rise to an increase in volume, causing flight problems of the read/write head due to aerodynamics deterioration and increased inertia of the microactuator-head unit.

SUMMARY OF THE INVENTION

An advantage of the present invention is to provide an integrated semiconductor material microactuator addressing the disadvantages of the microactuators described above.

According to an embodiment of the present invention, an integrated device comprising a semiconductor material microactuator is provided. The microactuator comprises a stator element electrostatically coupled to a rotor element, wherein the rotor element includes a suspended mass and a plurality of mobile arms extending radially from the suspended mass. The stator element comprises at least a first plurality of fixed arms extending radially to the suspended mass and facing respective mobile arms. The microactuator is connected to a drive unit for the fixed arms and to a measure unit that measures a position of the rotor element with respect to the stator element. The integrated device further comprises a capacitive uncoupling unit provided between the drive unit and the measure unit, wherein the capacitive uncoupling unit comprises at least one fixed arm and a respective mobile arm.

BRIEF DESCRIPTION OF THE DRAWINGS

For the understanding of the present invention, an illustrative embodiment is now described, purely by way of a non-limiting example, with reference to the attached drawings.

DETAILED DESCRIPTION OF THE ILLUSTRATED EMBODIMENTS

Figure 1:
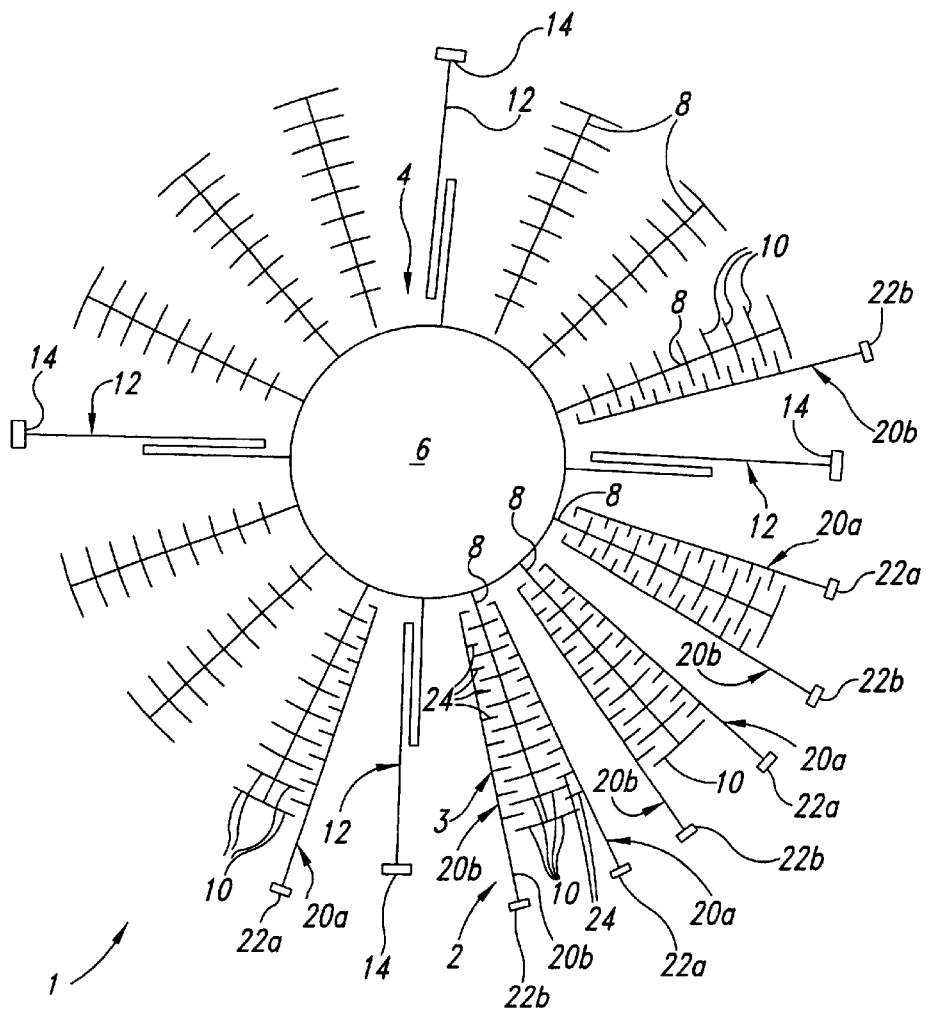
FIG. 1 shows a known integrated microactuator, schematically in plan view.
Figure 3:
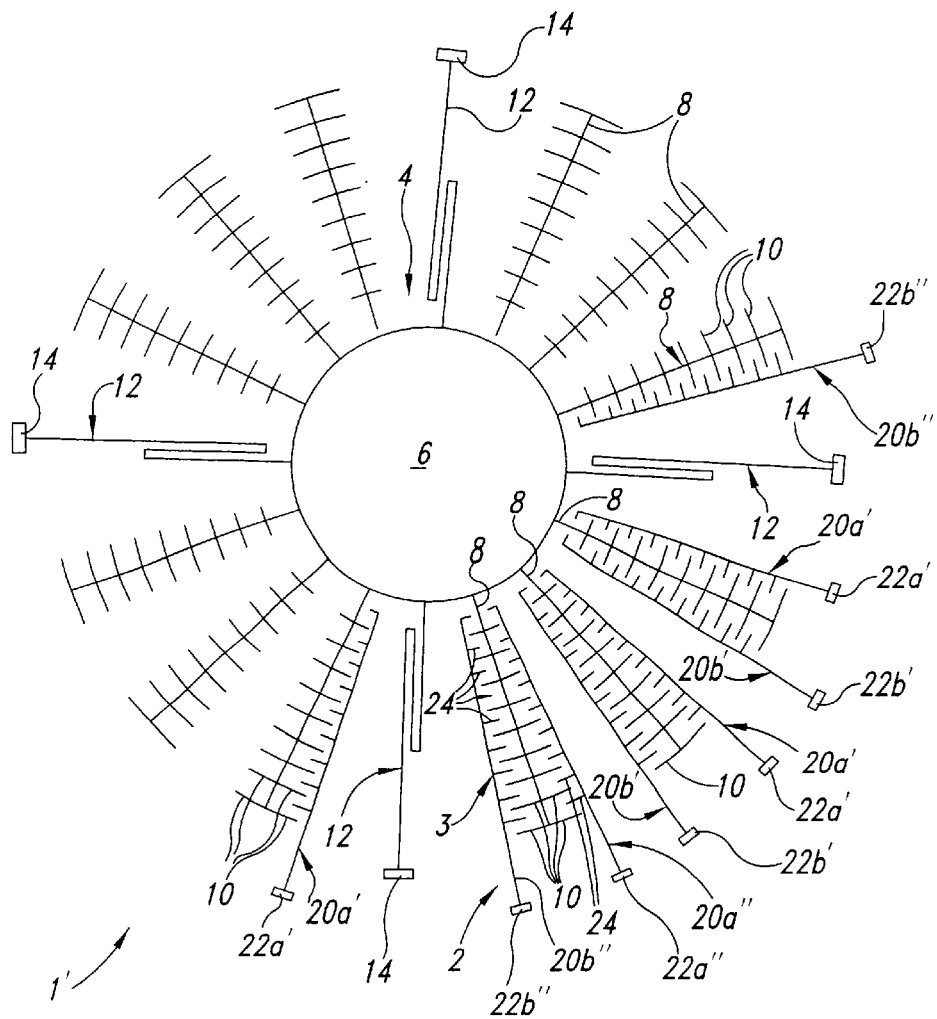
FIG. 3 illustrates an integrated microactuator according to an embodiment of the present invention, schematically in plan view.

A microactuator 1' in FIG. 3 has the same general structure of the microactuator 1 in FIG. 1. Therefore, parts similar to, or corresponding to, those of the microactuator 1 in FIG. 1 are identified with the same reference numbers. The microactuator 1' differs from the microactuator 1 of FIG. 1 in that fixed arms of the stator (indicated in FIG. 3 at 2') are not all connected both to the drive stage 30 and to the measure stage 32. In particular, according to FIG. 3, some fixed arms are directly connected only to the measure stage 32, whereas the remaining fixed arms are connected only to the drive stage 30.

In detail, for each quadrant of the microactuator 1', two fixed arms (called hereinafter as "fixed measure arms" and shown at 20a" and 20b") are directly connected to the measure stage 32 via respective nodes (called hereinafter as "measure nodes" and shown at 22a" and 22b"), whereas remaining fixed arms (called hereinafter as "fixed drive arms" and shown at 20a' and 20b') in each quadrant are directly connected to the drive stage 30 via respective nodes (called hereinafter as "drive nodes" and shown at 22a' and 22b'). The separation of drive functions from measure functions, and thus a division of the fixed arms 20a, 20b into the fixed drive arms 20a', 20b' and the fixed measure arms 20a", 20b", as well as a division of the nodes 22a, 22b into the drive nodes 22a', 22b' and the measure nodes 22a", 22b", means that an equivalent electrical circuit of the microactuator 1' is that illustrated in FIG. 4.

Figure 2:
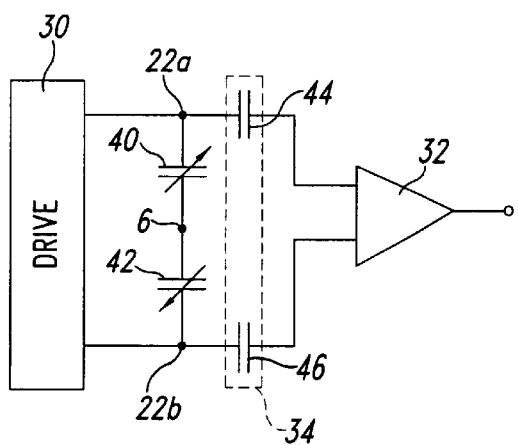
FIG. 2 illustrates an equivalent electronic diagram of a known integrated device, comprising the microactuator of FIG. 1.
Figure 4:
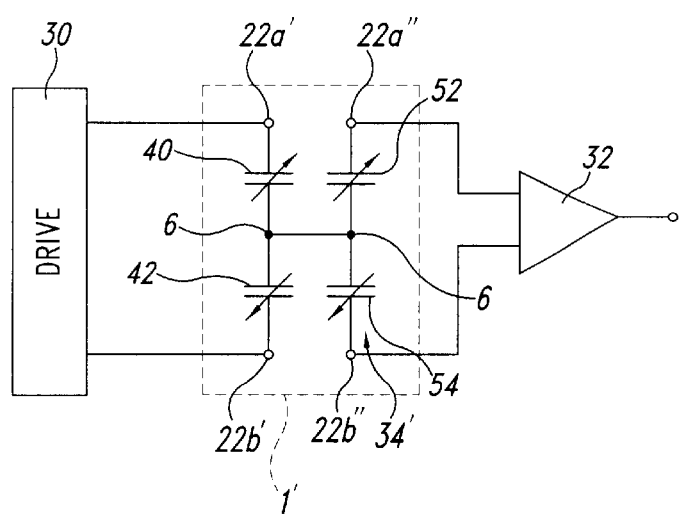
FIG. 4 illustrates an electronic diagram of an embodiment of an integrated device utilizing principles of the present invention.

In particular, the uncoupling structure 34 shown in FIG. 2, is now indicated at 34' in FIG. 4 and includes the microactuator 1' and comprises a first and a second uncoupling capacitor 52, 54, arranged between the suspended mass 6 and respective first and second inputs of the measure stage 32. The first uncoupling capacitor 52 is defined by a capacitive connection between the fixed measure arms 20a" and the respective mobile arms 8, and the second uncoupling capacitor 54 is defined by a capacitive connection between the fixed measure arms 20b" and the respective mobile arms 8.

A common part between the drive stage 30 and the measure stage 32 is then the suspended mass 6 of the rotor 4, which is nevertheless normally kept at a voltage close to ground, and therefore does not cause any problems. Since a force necessary to actuate the read/write head (not shown) depends on the number of fixed drive arms 20a', 20b', it is advantageous for the fixed measure arms 20a", 20b" in each quadrant to number no more than two arms.

Advantages of the above-described structure are as follows. First, forming the uncoupling capacitors 52, 54 using capacitive coupling inherent to the structure of the microactuator 1', rather than using respective metal structures, allows substantial reduction of the bulk and thus reduces associated problems of weight and volume. In particular, the reduction of bulk of the microactuator 1' reduces dimensions of a chip accommodating the microactuator 1' and an associated control logic unit, thereby reducing the weight that the read/write head support suspension (not shown) must bear. This increases the mechanical resonance frequency band of the system. It is thus possible to read and write hard disks having more tracks than those read and written using present microactuators.

In addition, data providing the position of the rotor 4 with respect to the stator 2 of the microactuator 1', no longer passes through a capacitive divider, but is obtained directly from the capacitors 52, 54 belonging to microactuator 1'. This allows an increase in resolutions of measurements made by the measure stage 32.

Also, the division of the fixed arms 20a, 20b into the fixed drive arms 20a', 20b' and the fixed measure arms 20a", 20b", and the division of the nodes 22a, 22b into the drive nodes 22a', 22b' and the measure nodes 22a", 22b", make it possible to design the fixed electrodes 24 of the fixed measure arms 20a", 20b" and their respective associated mobile electrodes 10 to maximize performance of the measure chain, thus providing a further degree of freedom for production of the system.

Finally, it is to be appreciated that changes and variations can be made to the microactuator 1' described and illustrated herein, without departing from the scope of the present invention. Although the above description specifically refers to use of the invention for actuation of hard disk read/write heads, it is understood that the description provides an illustrative example and that principles of the invention can be applied to other devices. Consequently, the invention is not limited by the above description, but instead the scope of the invention is to be determined entirely by the following claims, which are to be construed in accordance with established doctrines of claim interpretation.

What is claimed is:

1. An integrated device, comprising:
   a microactuator made of a semiconductor material;
   a stator element electrostatically coupled to a rotor element, wherein said rotor element comprises a suspended mass and a plurality of mobile arms extending radially from said suspended mass, wherein said stator element comprises at least a first plurality of fixed arms extending radially to said suspended mass and facing respective mobile arms, and wherein said microactuator is connected to a drive unit for said fixed arms and to a measure unit to measure a position of said rotor element with respect to said stator element; and
   a capacitive uncoupling unit provided between said drive unit and said measure unit, wherein said capacitive uncoupling unit comprises at least one said fixed arm and a respective said mobile arm.

2. The integrated device according to claim 1 wherein said stator element further comprises a second plurality of fixed arms associated with respective mobile arms of said rotor element, wherein each mobile arm is interposed between a pair of fixed arms formed by a respective fixed arm of said first plurality and a respective fixed arm of said second plurality.

3. The integrated device according to claim 2 wherein for each quadrant of said microactuator, said fixed arms comprise a plurality of pairs of fixed drive arms connected directly to said drive unit and at least one pair of fixed measure arms connected directly to said measure unit.

4. The integrated device according to claim 3 wherein said microactuator forms a first and a second capacitive element having first terminals connected to each other and second terminals connected to said drive unit, said first capacitive element being formed between first fixed drive arms of each of said pairs of fixed arms and the respective mobile arm, and said second capacitive element being formed between second fixed drive arms of each of said pairs of fixed arms and the respective mobile arm, and wherein said uncoupling unit comprises a third and a fourth capacitive element having first terminals connected to said first terminals of said first and second capacitive elements and second terminals connected to said measure unit, said third capacitive element being formed between a first one of said fixed measure arms and the respective mobile arm, and said fourth capacitive element being formed between a second one of said fixed measure arms and the respective mobile arm.

5. A microactuator for a hard disk read/write unit, the microactuator comprising:
   a rotor element including a suspended mass and a plurality of mobile arms extending from the suspended mass;
   a stator element electrostatically coupled to the rotor element, the stator element comprising:
      a first pair of fixed arms extending to the suspended mass and facing one of the plurality of mobile arms;
      a second pair of fixed arms extending to the suspended mass and facing a mobile arm different from the one of the plurality of mobile arms;
      a first pair of nodes electrically connected to respective fixed arms of the first pair of fixed arms; and
      a second pair of nodes different from the first pair of nodes and electrically connected to respective fixed arms of the second pair of fixed arms; and
   a first capacitive element formed between the first pair of fixed arms and the one of the plurality of mobile arms, wherein the rotor element rotates with respect to the stator element if a voltage is applied to the first pair of nodes;
   wherein the second pair of nodes are connected to a measure unit, the measure unit operable to measure a position of the rotor element with respect to the stator element.

6. The microactuator of claim 5, further comprising a second capacitive element formed between the second pair of fixed arms and the mobile arm different from the one of the plurality of mobile arms.

7. The microactuator of claim 5 wherein the first capacitive element has a first terminal connected to a node defined by the suspended mass and a second terminal connected to one of the first pair of nodes.

8. The microactuator of claim 5, further comprising a second capacitive element formed between the second pair of fixed arms and the mobile arm different from the one of the plurality of mobile arms, wherein the second capacitive element has a first terminal connected to a node defined by the suspended mass and a second terminal connected to one of the second pair of nodes.

9. The microactuator of claim 5 wherein the voltage applied to the first pair of nodes is provided by a drive unit.

10. A microactuator for a hard disk read/write unit, the microactuator comprising:
   a rotor element including a suspended mass and a plurality of mobile arms extending from the suspended mass;
   a stator element electrostatically coupled to the rotor element, the stator element comprising:
      a first pair of fixed arms extending to the suspended mass and facing one of the plurality of mobile arms;
      a second pair of fixed arms extending to the suspended mass and facing a mobile arm different from the one of the plurality of mobile arms;
      a first pair of nodes electrically connected to respective fixed arms of the first pair of fixed arms; and
      a second pair of nodes different from the first pair of nodes and electrically connected to respective fixed arms of the second pair of fixed arms; and
   a first capacitive element formed between the first pair of fixed arms and the one of the plurality of mobile arms, wherein the rotor element rotates with respect to the stator element if a voltage is applied to the first pair of nodes;
   wherein the first pair of fixed arms is connected to a drive unit and the second pair of fixed arms is connected to a measure unit.

11. A microactuator for a hard disk read/write unit, the microactuator comprising:
- a rotor element including a suspended mass and a plurality of mobile arms extending from the suspended mass;
- a stator element electrostatically coupled to the rotor element, the stator element comprising:
  - a first pair of fixed arms extending to the suspended mass and facing one of the plurality of mobile arms;
  - a second pair of fixed arms extending to the suspended mass and facing a mobile arm different from the one of the plurality of mobile arms;
  - a first pair of nodes electrically connected to respective fixed arms of the first pair of fixed arms; and
  - a second pair of nodes different from the first pair of nodes and electrically connected to respective fixed arms of the second pair of fixed arms;
- a first capacitive element formed between the first pair of fixed arms and the one of the plurality of mobile arms, wherein the rotor element rotates with respect to the stator element if a voltage is applied to the first pair of nodes; and
- a second capacitive element formed between the second pair of fixed arms and the mobile arm different from the one of the plurality of mobile arms, wherein the second capacitive element has a first terminal connected to first terminal of the first capacitive element and a second terminal connected to one of the second pair of nodes, wherein the first capacitive has a second terminal connected to one of the first pair of nodes, and wherein the first pair of nodes are connected to a drive unit and the second pair of nodes are connected to a measure unit.

12. A method of providing an integrated device having a microactuator, the method comprising:
- electrostatically coupling a rotor element to a stator element:
- radially extending a plurality of mobile arms from the rotor element;
- interleaving one of the plurality of mobile arms between a pair of first fixed arms;
- interleaving a mobile arm different from the one of the plurality of mobile arms between a pair of second fixed arms;
- electrically connecting a first pair of nodes to respective fixed arms of the first pair of fixed arms;
- electrically connecting a second pair of nodes different from the first pair of nodes to respective fixed arms of the second pair of fixed arms;
- forming a first capacitive element between the first pair of fixed arms and the one of a plurality of mobile arms, wherein the rotor element is movable with respect to the stator element if a voltage is applied to the first pair of nodes;
- connecting the first pair of nodes to a drive unit, wherein the drive unit is operable to apply the voltage to the first pair of nodes; and
- connecting the second pair of nodes to a measure unit, wherein the measure unit is operable to measure a position of the rotor element with respect to the stator element.

13. The method of claim 12, further comprising forming a second capacitive element between the second pair of fixed arms and the mobile arm different from the one of a plurality of mobile arms.

14. The method of claim 12, further comprising respectively connecting first and second terminals of the first capacitive element to a node of the rotor element and to one of the first pair of nodes.

15. The method of claim 12, further comprising:
- forming a second capacitive element between the second pair of fixed arms and the mobile arm different from the one of a plurality of mobile arms; and
- respectively connecting first and second terminals of the second capacitive element to a node of the rotor element and to one of the second pair of nodes.

16. A method of providing an integrated device having a microactuator, the method comprising:
- electrostatically coupling a rotor element to a stator element;
- radially extending a plurality of mobile arms from the rotor element;
- interleaving one of the plurality of mobile arms between a pair of first fixed arms;
- interleaving a mobile arm different from the one of the plurality of mobile arms between a pair of second fixed arms;
- electrically connecting a first pair of nodes to respective fixed arms of the first pair of fixed arms;
- electrically connecting a second pair of nodes different from the first pair of nodes to respective fixed arms of the second pair of fixed arms;
- forming a first capacitive element between the first pair of fixed arms and the one of a plurality of mobile arms, wherein the rotor element is movable with respect to the stator element if a voltage is applied to the first pair of nodes;
- providing the microactuator with a plurality of regions; and
- respectively connecting first and second pairs of fixed arms located in one of the plurality of regions to a drive unit and to a measure unit.

17. A method of providing an integrated device having a microactuator, the method comprising:
- electrostatically coupling a rotor element to a stator element;
- radially extending a plurality of mobile arms from the rotor element;
- interleaving one of the plurality of mobile arms between a pair of first fixed arms;
- interleaving a mobile arm different from the one of the plurality of mobile arms between a pair of second fixed arms;
- electrically connecting a first pair of nodes to respective fixed arms of the first pair of fixed arms;
- electrically connecting a second pair of nodes different from the first pair of nodes to respective fixed arms of the second pair of fixed arms;
- forming a first capacitive element between the first pair of fixed arms and the one of a plurality of mobile arms, wherein the rotor element is movable with respect to the stator element if a voltage is applied to the first pair of nodes;
- forming a second capacitive element between the second pair of fixed arms and the mobile arm different from the one of a plurality of mobile arms;
- respectively connecting first and second terminals of the second capacitive element to a first terminal of the first capacitive element and to one of the second pair of nodes;
- connecting a second terminal of the first capacitive element to one of the first pair of nodes; and
- respectively connecting the first and second pairs of nodes to a drive unit and to a measure unit.

* * * * *